United States Patent
Kim et al.

(10) Patent No.: US 10,218,478 B2
(45) Date of Patent: Feb. 26, 2019

(54) METHOD FOR DETERMINING WEIGHT FOR BEAMFORMING IN WIRELESS COMMUNICATION SYSTEM AND APPARATUS THEREFOR

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

(21) Appl. No.: 15/505,496

(22) PCT Filed: Jun. 25, 2015

(86) PCT No.: PCT/KR2015/006490
§ 371 (c)(1),
(2) Date: Feb. 21, 2017

(87) PCT Pub. No.: WO2016/032104
PCT Pub. Date: Mar. 3, 2016

(65) Prior Publication Data
US 2017/0272223 A1 Sep. 21, 2017

Related U.S. Application Data

(60) Provisional application No. 62/041,124, filed on Aug. 24, 2014.

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0617* (2013.01); *H04B 7/0639* (2013.01);
(Continued)

(58) Field of Classification Search
CPC ... H04L 5/0048; H04B 7/0617; H04B 7/0639; H04B 7/08; H04B 7/0695; H04B 7/088; H04W 72/046; H04W 88/02; H04W 88/08
(Continued)

(56) References Cited

U.S. PATENT DOCUMENTS

| 6,930,637 B2 | 8/2005 | Brothers, Jr. et al. |
| 2009/0238156 A1 | 9/2009 | Yong et al. |

(Continued)

FOREIGN PATENT DOCUMENTS

WO  WO 2004/114460 A2  12/2004

*Primary Examiner* — Obaidul Huq
(74) *Attorney, Agent, or Firm* — Birch, Stewart, Kolasch & Birch, LLP

(57) ABSTRACT

A method is provided for determining a weight for hybrid beamforming. A base station signals, to a user equipment, a configuration for repeated transmission of a first omnidirectional beam equally formed in all directions, receives the first omnidirectional beam from the user equipment by forming a second omnidirectional beam, and repeatedly receives the first omnidirectional beam from the user equipment by sequentially forming a plurality of directional beams corresponding to a plurality of directions. The base station determines a weight for hybrid beamforming by obtaining a gain difference between the first omnidirectional beam received through the second omnidirectional beam and the first omnidirectional beam received through a first directional beam among the plurality of directional beams, selecting a precoding matrix indicator (PMI) and acquiring, based on the PMI, a coefficient of a phase shifter and a coefficient of a power amplifier for analog beamforming of the hybrid beamforming.

7 Claims, 12 Drawing Sheets

(51) Int. Cl.
    *H04B 7/08*         (2006.01)
    *H04W 72/04*      (2009.01)
    *H04W 88/02*      (2009.01)
    *H04W 88/08*      (2009.01)

(52) U.S. Cl.
    CPC ............ *H04B 7/0695* (2013.01); *H04B 7/08* (2013.01); *H04B 7/088* (2013.01); *H04W 72/046* (2013.01); *H04W 88/02* (2013.01); *H04W 88/08* (2013.01)

(58) Field of Classification Search
    USPC ........................................ 370/310, 328, 329
    See application file for complete search history.

(56) References Cited

U.S. PATENT DOCUMENTS

| | | | |
|---|---|---|---|
| 2013/0002487 A1 | 1/2013 | Hosoya et al. | |
| 2013/0215844 A1 | 8/2013 | Seol et al. | |
| 2013/0257655 A1 | 10/2013 | Hu et al. | |
| 2013/0301454 A1 | 11/2013 | Seol et al. | |
| 2013/0343303 A1* | 12/2013 | Kim ..................... | H04B 7/0452 370/329 |
| 2014/0146863 A1* | 5/2014 | Seol ..................... | H04B 7/0456 375/224 |
| 2014/0185481 A1 | 7/2014 | Seol et al. | |
| 2016/0006122 A1* | 1/2016 | Seol ..................... | H04B 7/0408 342/372 |

\* cited by examiner

METHOD FOR DETERMINING WEIGHT FOR BEAMFORMING IN WIRELESS COMMUNICATION SYSTEM AND APPARATUS THEREFOR

CROSS REFERENCE TO RELATED APPLICATIONS

This application is the National Phase of PCT International Application No. PCT/KR2015/006490, filed on Jun. 25, 2015, which claims priority under 35 U.S.C. 119(e) to U.S. Provisional Application No. 62/041,124, filed on Aug. 24, 2014, all of which are hereby expressly incorporated by reference into the present application.

TECHNICAL FIELD

The present invention relates to a method for determining a weight in order to perform hybrid beamforming in a wireless communication system and an apparatus therefor.

BACKGROUND ART

MIMO (multiple-input multiple-output) used in a wireless communication system is a scheme of increasing channel capacity and enhancing transceiving efficiency using multiple transmitting antennas and/or multiple receiving antennas. MIMO may be called a multi-antenna.

In MIMO environment, it may be unnecessary for data to be transmitted on a single antenna path. For instance, in MIMO environment, a receiver can reconfigure data by aggregating data fragments respectively received through a plurality of receiving antennas. Comparing a single antenna environment and an MIMO environment to each other, a data rate can be improved by maintaining a cell area size or coverage can be increased by maintaining a data rate, in MIMO environment.

A beamforming scheme in MIMO environment is widely used for a base station, a user equipment, a relay or the like. The beamforming scheme can be classified into a digital beamforming scheme or an analog beamforming scheme depending on whether a weight vector/matrix (or a precoding vector/matrix) is used for a baseband or an RF band. And, the digital beamforming scheme is applied to a precoding procedure of 3G/4G mobile communication system. For instance, in a current mobile communication system, a user equipment feds back a precoding matrix index (PMI) to a base station for a closed-loop based digital beamforming and the base station performs a beamforming based on the PMI.

DISCLOSURE

Technical Problem

An object of the present invention devised to solve the problem lies in a method for efficiently and quickly determining weights for beamforming in a wireless communication system and an apparatus therefor.

Additional objects of the present invention can be derived from the embodiments of the present invention.

Technical Solution

The object of the present invention can be achieved by providing a method for determining a weight for hybrid beamforming by a base station in a wireless communication system, the method including signaling to a user equipment a configuration for repeated transmission of a first omnidirectional beam equally formed in all directions, receiving the first omnidirectional beam from the user equipment by forming a second omnidirectional beam, repeatedly receiving the first omnidirectional beam from the user equipment by sequentially forming a plurality of directional beams corresponding to a plurality of directions, and determining a weight for hybrid beamforming based on a gain difference between the first omnidirectional beam received through the second omnidirectional beam and the first omnidirectional beam received through a first directional beam among the plurality of directional beams.

In another aspect of the present invention, provided herein is a base station for determining a weight for hybrid beamforming in a wireless communication system, the base station including a transmitter configured to signal to a user equipment a configuration for repeated transmission of a first omnidirectional beam equally formed in all directions, a receiver configured to receive the first omnidirectional beam from the user equipment by forming a second omnidirectional beam and to repeatedly receive the first omnidirectional beam from the user equipment by sequentially forming a plurality of directional beams corresponding to a plurality of directions, and a processor configured to determine a weight for hybrid beamforming based on a gain difference between the first omnidirectional beam received through the second omnidirectional beam and the first omnidirectional beam received through a first directional beam among the plurality of directional beams.

In another aspect of the present invention, provided herein is a method for transmitting, by a user equipment, a signal for determining a weight of hybrid beamforming in a wireless communication system, the method including receiving, from a base station, a configuration for repeated transmission of a first omnidirectional beam equally formed in all directions, and repeatedly transmitting the first omnidirectional beam a plurality of times according to the received configuration, wherein an initial transmission of the first omnidirectional beam repeatedly transmitted is measured through a second omnidirectional beam formed by the base station and transmissions of the first omnidirectional beam after the initial transmission are measured through a plurality of directional beams formed by the base station.

In another aspect of the present invention, provided herein is a user equipment for transmitting a signal for determining a weight of hybrid beamforming in a wireless communication system, the user equipment including a receiver configured to receive, from a base station, a configuration for repeated transmission of a first omnidirectional beam equally formed in all directions, a transmitter configured to repeatedly transmit the first omnidirectional beam a plurality of times according to the received configuration, and a processor configured to control the receiver and the transmitter, wherein an initial transmission of the first omnidirectional beam repeatedly transmitted is measured through a second omnidirectional beam formed by the base station and transmissions of the first omnidirectional beam after the initial transmission are measured through a plurality of directional beams formed by the base station.

Preferably, the configuration for repeated transmission of the first omnidirectional beam may include at least one of the number of repeated transmissions of the first omnidirectional beam, a transmission periodicity of the first omnidirectional beam, and information about a size of a frequency band for transmission of the first omnidirectional beam.

Preferably, the first omnidirectional beam may correspond to a quasi-omnidirectional beam transmitted through a sounding reference signal (SRS).

Preferably, the number of repeated transmissions of the first omnidirectional beam may be determined based on the number of search spaces for the plurality of directional beams or a beam width of the plurality of directional beams.

Preferably, the first directional beam may be a directional beam having a largest gain for reception of the first omnidirectional beam among the plurality of directional beams.

Preferably, the base station may select, from the codebook, a precoding matrix indicator (PMI) corresponding to a combination of an index of the first directional beam and the gain difference. More preferably, the base station may acquire, based on the selected PMI, a coefficient of a phase shifter and a coefficient of a power amplifier for analog beamforming included in the hybrid beamforming.

Preferably, the base station may perform, using the determined weight, the hybrid beamforming in which analog beamforming and digital beamforming are hierarchically coupled with each other.

Advantageous Effects

According to an embodiment of the present invention, analog beam scanning necessary for hybrid beamforming may be performed, and a base station may efficiently and quickly determine a PMI without feedback from a user equipment.

The effects of the present invention are not limited thereto, and other technical effects can be derived from the embodiments of the present invention.

MODE FOR INVENTION

Reference will now be made in detail to the preferred embodiments of the present invention, examples of which are illustrated in the accompanying drawings. Configurations, functions and other features of the present invention can be easily understood through the embodiments of the present invention.

In the present specification, a name of a base station can be used as an inclusive terminology for RRH (remote control head), eNB, TP (transmission point), RP (repetition point), RN (relay) or the like. Moreover, in case of applying carrier aggregation, an operation of a base station described by the invention may be applicable to a component carrier (CC) or a cell. A beamforming covers the precoding concept and a weight vector/matrix for a beamforming covers the concept of a precoding vector/matrix.

MIMO Environment

Figure 1:
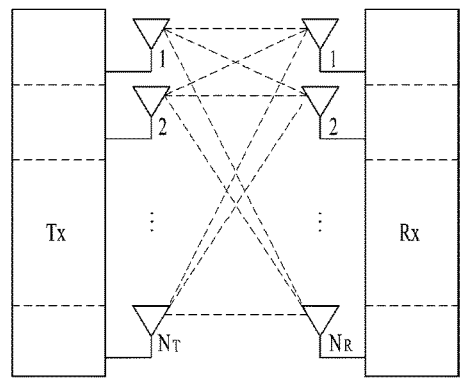
FIG. 1 is a diagram of a general MIMO environment.

A general MIMO (multi-input multi-output) environment is described with reference to FIG. 1 as follows.

$N_T$ transmitting antennas are installed on a transmitting stage, while $N_R$ receiving antennas are installed on a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_0$ by a rate increasing rate $R_i$, as shown in Equation 1. In this case, $R_i$ is a smaller one of $N_T$ and $N_R$.

$$R_i = \min(N_T, N_R) \quad \text{[Equation 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 1, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Equation 2.

$$s=[s_1,s_2,\ldots,s_{N_T}]^T \qquad \text{[Equation 2]}$$

Meanwhile, transmission powers can be set different from each other for transmission informations $S_1, S_2, \ldots, S_{N_T}$, respectively. If the transmission powers are set to $P_1, P_2, \ldots, P_{N_T}$, respectively, the transmission power adjusted transmission information can be represented as Equation 3.

$$\hat{s}=[\hat{s}_1,\hat{s}_2,\ldots,\hat{s}_{N_T}]^T P_1 s_1, P_2 s_2, \ldots, P_{N_T} s_{N_T}]^T \qquad \text{[Equation 3]}$$

And, $\hat{S}$ may be represented as Equation 4 using a diagonal matrix P of the transmission power.

$$\hat{s} = \begin{bmatrix} P_1 & & & 0 \\ & P_2 & & \\ & & \ddots & \\ 0 & & & P_{NT} \end{bmatrix} \begin{bmatrix} s_1 \\ s_2 \\ \vdots \\ s_{N_T} \end{bmatrix} = Ps \qquad \text{[Equation 4]}$$

Let us consider a case of configuring $N_T$ transmitted signals $x_1, x_2, \ldots, x_{N_T}$, which are actually transmitted, by applying a weight matrix W to a transmission power adjusted information vector $\hat{S}$. In this case, the weight matrix plays a role in properly distributing each transmission information to each antenna according to a transmission channel status and the like. The transmitted signals are set to $x_1, x_2, \ldots, x_{N_T}$ may be represented as Equation 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \qquad \text{[Equation 5]}$$

$$\begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by Equation, a rank of a channel H (i.e., rank (H)) is limited by Equation 6.

$$\text{rank}(H) \leq \min(N_T, N_R) \qquad \text{[Equation 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix H may be represented as Equation 7.

$$\text{\# of streams} \leq \text{rank}(H) \leq \min(N_T, N_R) \qquad \text{[Equation 7]}$$

In this case, '# of streams' may indicate the number of streams. Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

The maximum number of transceiving antennas is assumed as 8 in a general MIMO environment. Yet, as the MIMO environment is evolved into a massive MIMO, the number of antennas can increase over tens or hundreds.

Figure 2:
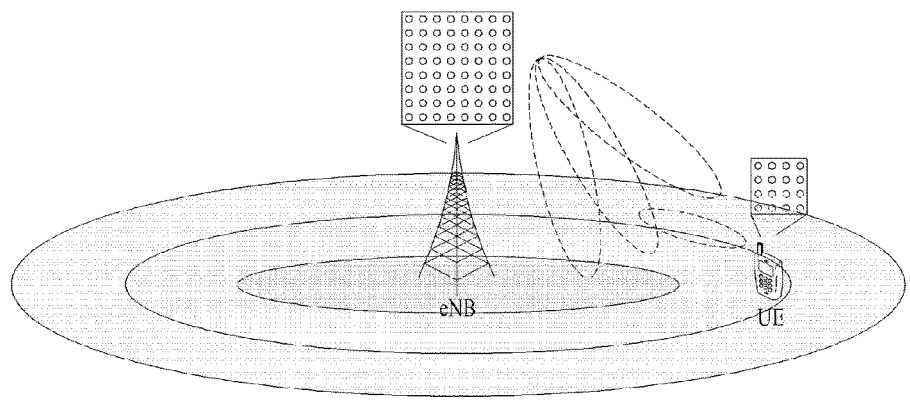
FIG. 2 is a diagram of a massive MIMO environment.

FIG. 2 shows one embodiment of a massive MIMO environment. Particularly, FIG. 2 diagrammatizes a system in which a base station or user equipment has a plurality of of transmitting/receiving antennas capable of an active antenna system based 3D beamforming.

Referring to FIG. 2, if a 3D (3-dimensional) beam pattern is utilized in a transmitting antenna aspect, it is able to perform a quasi-static or dynamic beamforming in a vertical direction of a beam as well as in a horizontal direction of the beam. And, it is also able to consider application such as a sector forming in a vertical direction or the like. Moreover, in a receiving antenna aspect, when a receiving beam is formed using massive receiving antennas, it is able to expect a signal power increasing effect in accordance with an antenna array gain. Hence, in case of uplink, a base station can receive a signal transmitted from a user equipment through a plurality of of antennas. In doing so, it is advantageous in that the user equipment can set its transmission power to a very low power in consideration of a gain of the massive receiving antennas in order to reduce interference influence.

Analog Beamforming & Digital Beamforming

Figure 3:
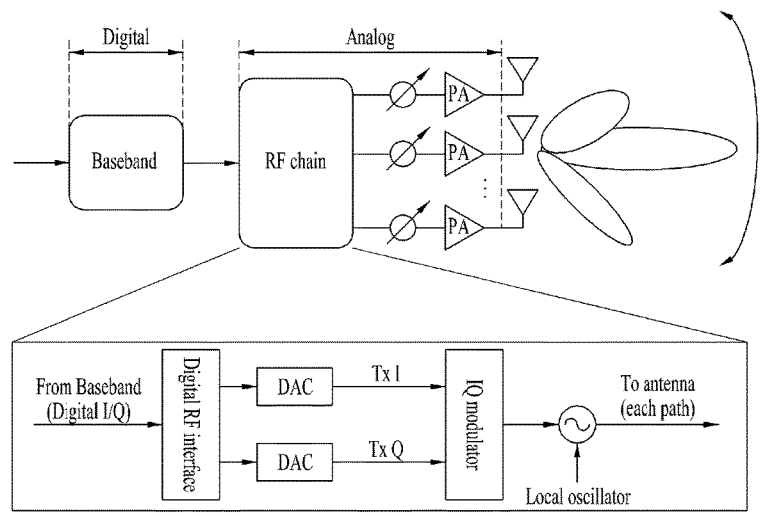
FIG. 3 is a diagram for one example of an analog beamforming scheme.

FIG. 3 is a diagram for one example of an analog beamforming scheme. An analog beamforming scheme is a representative beamforming scheme applied to an initial multi-antenna structure. A beamforming is performed in a manner as follows. First of all, after a digital signal processing has been completed, an analog signal is made to diverge into a plurality of of paths. Secondly, phase shift (PS) and power amplification (power amplifier: PA) are set up on each of the diverging paths.

Referring to FIG. 3, an analog beamforming is performed in a manner that a power amplifier and a phase shifter connected to an antenna process an analog signal outputted from a single digital signal. In an analog stage, the phase shifter and the power amplifier applies a complex weight to the analog signal. In FIG. 1, an RF (radio frequency) chain means a processing block for converting a signal digital signal to an analog signal.

Yet, according to an analog beamforming scheme, accuracy of a beam is determined depending on characteristics of devices of the phase shifter and the power amplifier. Hence, in aspect of controlling the devices of the phase shifter and the power amplifier, the analog beamforming scheme is appropriate for a narrowband transmission. According to the analog beamforming scheme, since complexity of a hardware structure increases considerably in case of implementing a multi-stream transmission, it is difficult to improve a transmission rate through a multiplexing gain and it is also difficult to perform a beamforming per user based on orthogonal resource allocation.

Figure 4:
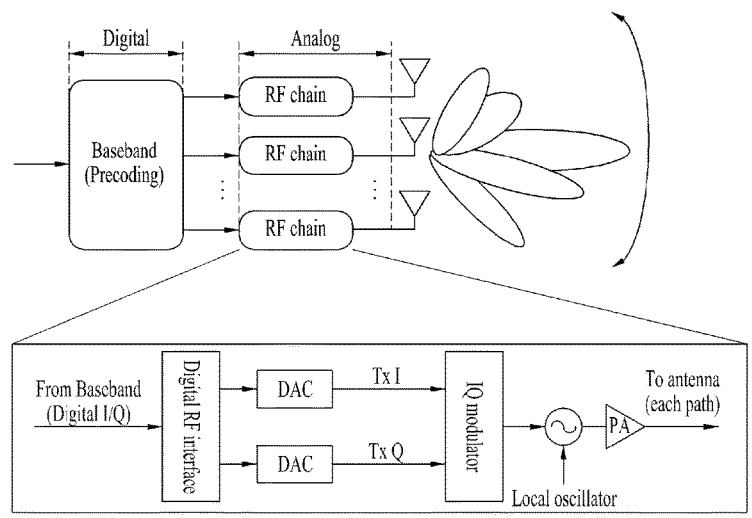
FIG. 4 is a diagram for one example of a digital beamforming scheme.

FIG. 4 is a diagram for one example of a digital beamforming scheme. According to the digital beamforming scheme, a beamforming is performed in a digital stage using a baseband process. Hence, unlike the analog beamforming scheme, the digital beamforming scheme is appropriate for maximizing diversity and multiplexing gain in an MIMO environment.

Referring to FIG. 4, application of a weight matrix (or a precoding matrix), e.g., a precoding is performed in a baseband process. In case of a digital beamforming, unlike the case of the analog beamforming shown in FIG. 1, an RF chain includes a power amplifier. The reason for this is that a complex weight for a beamforming is directly applied to a transmitted data.

Moreover, according to a digital beamforming scheme, it is able to form a beam different for each user. For instance, beams for multiple users can be simultaneously formed. Since it is possible to implement a digital beamforming independent for each user to which an orthogonal resource is allocated, a scheduling is relatively free and an operation of a transmitting stage in accordance with a system purpose is facilitated. Moreover, if MIMO-OFDM (orthogonal frequency division multiplexing) and technology are applied in a broadband transmission environment, it is able to form a beam independent per subcarrier. Thus, according to the digital beamforming scheme, since system capacity and beam gain are improved, a transmission rate for each user can be maximized.

In order to apply a digital beamforming technology in a massive MIMO environment, since a baseband processor should perform a precoding process for hundreds of antennas, digital signal processing complexity increases considerably. Moreover, since RF chains are required as many as the number of antennas, hardware implementation complexity increases considerably. Particularly, in case of FDD (frequency division duplex) system, since feedback information on massive MIMO channels for the entire antennas is required, it is disadvantageous in that a reference signal (or pilot signal) transmission and feedback overhead for the corresponding transmission are increased considerably.

If an analog beamforming technology is applied in a massive MIMO environment, hardware complexity of a transmitting stage is relatively low, an performance increase extent using multiple antennas is insignificant, and flexibility of resource allocation is lowered. Particular, in case of a broadband transmission, it is very difficult to control a beam per frequency.

Table 1 shows performance gain and complexity relations between an analog beamforming scheme and a digital beamforming scheme.

TABLE 1

|  | Beamforming accuracy control facilitation | Multicarrier beam control | Multi-stream transmission | Hardware complexity (BB process) | Pilot and feedback overhead |
| --- | --- | --- | --- | --- | --- |
| Analog beamforming scheme | Low (PA/PS device characteristics and relation) | Impossible or difficult | Impossible or difficult | Low | Low |
| Digital beamforming scheme | High | Possible | Possible | High | High |

Modeling of Hybrid Beamforming

In a massive MIMO environment according to one embodiment of the present invention, instead of selectively applying one of an analog beamforming scheme and a digital beamforming scheme, it is able to apply a hybrid beamforming resulting from combining an analog beamforming structure and a digital beamforming structure together. Therefore, in order to lower hardware implementation complexity of a transmitting stage and to obtain a maximum beamforming gain using a massive MIMO, it is necessary to design a transmitting stage structure of a hybrid type.

Figure 5:
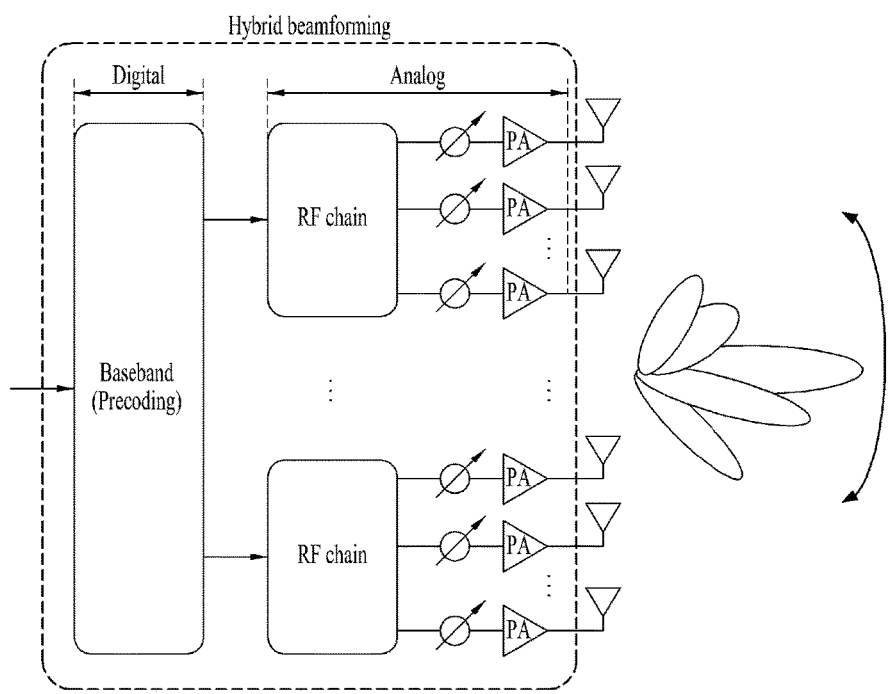
FIG. 5 is a diagram to describe the concept of a hybrid beamforming according to one embodiment of the present invention.

FIG. 5 is a diagram to describe the concept of a hybrid beamforming according to one embodiment of the present invention. According to a hybrid beamforming, a digital signal of a baseband having a digital beamforming scheme applied thereto is primarily converted to an analog signal of an RF band and an analog beamforming scheme is secondarily applied to the analog signal. Hence, for a hybrid beamforming scheme, a transmitting stage should be able to support both of the digital beamforming scheme and the analog beamforming scheme.

Items or matters taken into consideration for a hybrid beamforming are described as follows.

It is difficult to simultaneously optimize an analog beamforming and a digital beamforming. Basically, a digital beamforming is able to apply a beamforming scheme independent per user with the same time-frequency resource. On the other hand, an analog beamforming has a limitation such that a beamforming scheme common to users should be applied with the same time-frequency resource. The limitation of the analog beamforming causes difficulty in optimizing the supportable rank number, beam control flexibility and beamforming resolution in a hybrid beamforming.

An analog beamforming scheme for forming a beam in a specific direction only in the same time-frequency resource has difficulty in forming a plurality of of beams in all user equipment direction at the same time.

Hence, the analog beamforming scheme causes a problem that UL/DL control channel, reference signal, synchronization signal and the like are not transmitted simultaneously to all user equipments distributed in all areas in a cell.

In case of performing channel estimation on an analog/digital beam, a digital beamforming scheme can use an existing orthogonal pilot assignment as it is. Yet, in an analog beamforming scheme, a time-duration amounting to the number of beam candidates is required. A time delay taken for a channel estimation of an analog beam is relatively long. In case of estimating a digital beam and an analog beam simultaneously, complexity increases considerably.

According to a digital beamforming scheme, a beamforming for multiple users/streams is free. Yet, according to an analog beamforming scheme, since a beamforming by the same weight vector/matrix is performed on a full transmission band, it is difficult to perform a beamforming independent per user or stream. Particularly, since FDMA (e.g., OFDMA) support through orthogonal frequency resource allocation is difficult, it is difficult to optimize a frequency resource.

In the following description, feedback methods for a hydro beamforming are explained in consideration of the features or properties mentioned in the foregoing description. First of all, in an existing mobile communication system that uses one of an analog beamforming scheme and a digital beamforming scheme, performing a closed loop based beamforming (or precoding) is facilitated. For instance, a user equipment receives a reference signal transmitted by a base station and then determines a precoding matrix index (PMI), a rank indicator (RI), and a channel quality indicator (CQI). The user equipment feeds back a channel state information (CSI) containing the PMI, CQI and/or RI to the base station. Subsequently, the base station performs a beamforming using the PMI transmitted by the user equipment. Alternatively, the base station may perform a beamforming using a different PMI without being restricted by the PMI transmitted by the user equipment.

Thus, in case that the existing method is intactly applied to a hybrid beamforming, a user equipment should measure and report a PMI for an analog beamforming and a PMI for a digital beamforming, respectively. Hence, overhead for the measurement and reporting increases twice. Moreover, if the PMI for the analog beamforming and the beamforming for the digital beamforming are different from each other, it causes another problem. For instance, assuming that an optimal PMI for an analog beamforming and an optimal PMI for a digital beamforming indicate a zero-degree direction and a 30-degree direction, respectively, since a direction of an analog beam and a direction of a digital beam are different from each other, a gain of a hydro beamforming may be represented as low considerably.

According to one embodiment of the present invention, it is able to determine a PMI for a digital beamforming based on a measurement of an analog beam. For instance, a user equipment feeds back only a measurement result of an analog beam to a base station and may not feed back a PMI for a digital beamforming. For another instance, a user equipment may determine a PMI for a digital beamforming using a measurement result of an analog beam. A measurement result of the analog beam and the PMI for the digital beamforming may be fed back to a base station.

Figure 6:
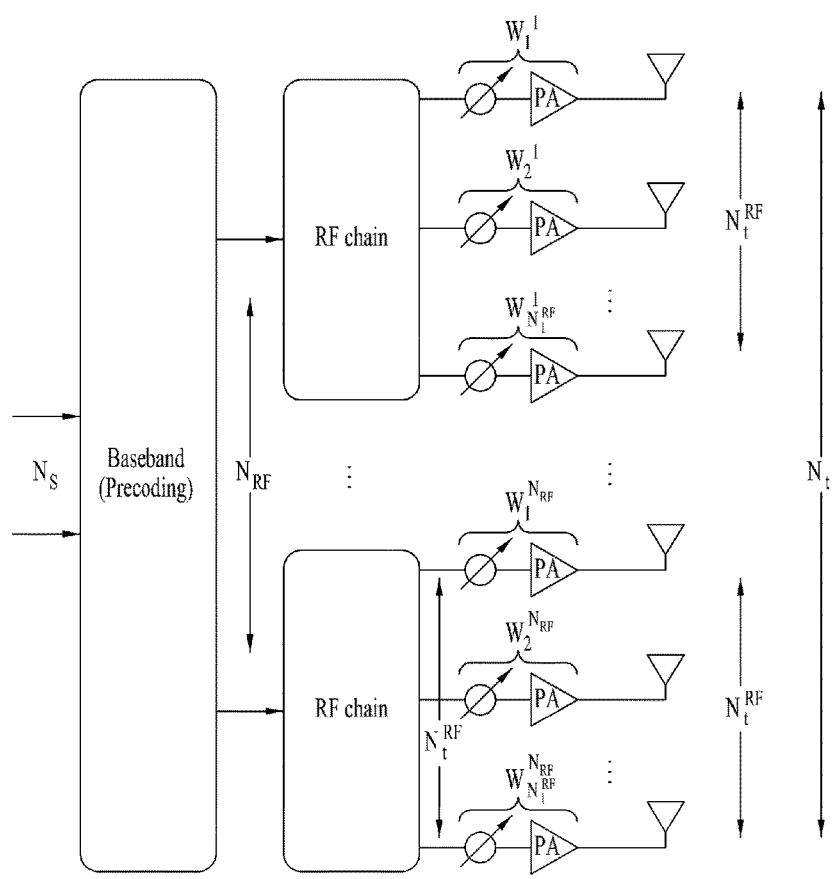
FIG. 6 is a diagram of a structure of a transmitting stage for performing a hybrid beamforming according to one embodiment of the present invention.

FIG. 6 is a diagram of a structure of a transmitting stage for performing a hybrid beamforming according to one embodiment of the present invention. According to the present embodiment, each RF chain is assumed as including $N_t^{RF}$ independent antennas, by which the present embodiment is non-limited. For instance, the number of antennas provided to each RF chain may be configured differently.

According to the present embodiment, a relation of $N_t = N_t^{RF} \times N_{RF}$ exists among the total antenna number $N_t$, the RF chain number NRF and the per-RF chain antenna number $N_t^{RF}$. Since a signal having passed through a phase shifter and a power amplifier per RF chain is sent to a transmitting antenna, a system model can be defined as Equation 8.

$$y_k = H_k F^{RF} F_k^{BB} s_k + z_k \quad \text{[Equation 8]}$$

In Equation 8, the k indicates a subcarrier index. The subcarrier index k has a value ranging 0 to $(N_{FFT}-1)$. The $N_{FFT}$ indicates a maximum FFT (Fast Fourier Transform) size supported by a system. And, the total subcarrier number may be limited to a range within the FFT size.

The $y_k$ means a received signal vector having a size '$N_r \times 1$' in the subcarrier k. The $H_k$ means a channel matrix having a size of '$N_r \times N_t$' in the subcarrier k. The $F^{RF}$ means an RF precoder (i.e., a weight matrix for an analog beamforming) having a size of '$N_t \times N_t$' in a whole subcarrier. And, the RF precoder (analog beamforming) may be identically applicable to the whole subcarrier. The $F_k^{BB}$ means a baseband precoder (i.e., a weight matrix for a digital beamforming) having a size of '$N_{RF} \times N_S$' in the subcarrier k. And, the baseband precoder (digital beamforming) may be individually configured per subcarrier. The $s_k$ indicates a transmitted signal vector having a size of '$N_S \times 1$' in the subcarrier k and the $z_k$ indicates a noise signal vector having a size of '$N_r \times 1$' in the subcarrier k.

The $N_{RF}$ indicates the total number of RF chains, the $N_t$ means the total number of the transmitting stage antennas, and the $N_t^{RF}$ means the number transmitting antennas provided per RF chain. The $N_r$ indicates the total number of the receiving stage antennas and the $N_s$ indicates the number of transmitted data streams.

Each term in Equation 8 is represented in detail as Equation 9.

$$\begin{bmatrix} y^{(1)} \\ \vdots \\ y^{(N_r)} \end{bmatrix} = \begin{bmatrix} h_{11} & h_{12} & \cdots & h_{1N_t} \\ h_{21} & h_{22} & \cdots & h_{2N_t} \\ \vdots & \vdots & \ddots & \vdots \\ h_{N_r 1} & h_{N_r 2} & \cdots & h_{N_r N_t} \end{bmatrix} \quad \text{[Equation 9]}$$

$$F^{RF} \left( \begin{bmatrix} v_{1,1} & v_{1,2} & \cdots & v_{N_{RF}, N_S} \\ v_{2,1} & v_{2,2} & \cdots & v_{N_{RF}, N_S} \\ \vdots & \vdots & \ddots & \vdots \\ v_{N_{RF},1} & v_{N_{RF},2} & \cdots & v_{N_{RF}, N_S} \end{bmatrix} \begin{bmatrix} x^{(1)} \\ \vdots \\ x^{(N_S-1)} \end{bmatrix} \right) +$$

$$\begin{bmatrix} z^{(1)} \\ \vdots \\ z^{(N_r)} \end{bmatrix}$$

The '$N_t \times N_{RF}$' precoding matrix $F^{RF}$ of an analog beamforming performed after an RF chain by a phase shifter and a power amplifier can be expressed as Equation 10 in the following.

$$F^{RF} = \begin{bmatrix} w^1_{N_t^{RF}} & 0 & 0 & \cdots & 0 \\ 0 & w^2_{N_t^{RF}} & 0 & \cdots & 0 \\ 0 & 0 & w^3_{N_t^{RF}} & \cdots & 0 \\ \vdots & \vdots & \vdots & \ddots & \vdots \\ 0 & 0 & 0 & \cdots & w^{N_{RF}}_{N_t^{RF}} \end{bmatrix} \quad \text{[Equation 10]}$$

Moreover, a vector indicating a weight for each of t antennas belonging to an RF chain I in the precoding matrix $F^{RF}$ can be defined as Equation 11 in the following.

$$w^j_{N_t^{RF}} = \begin{bmatrix} w^j_1 \\ w^j_2 \\ \vdots \\ w^j_{N_t^{RF}} \end{bmatrix} \quad \text{[Equation 11]}$$

Beam Radiation Pattern of Hybrid Beamforming

A hybrid beamforming scheme of the present invention can be performed based on one of antennas of various types including a 1D array, a 2D array, a ring type array and the like. For clarity of the following description, a beam radiation pattern of a hybrid beamforming is described based on ULA (Uniform linear array) antenna. The ULA antenna is exemplarily illustrated, by which the scope of the appended claims and their equivalents is non-limited. In the ULA antenna, a plurality of of antenna elements are linearly arrayed in a manner of being spaced apart from each other by an equal space d.

An array response vector of the ULA antenna is expressed as Equation 12 in the following.

$$a(\theta) = \begin{bmatrix} 1 & \exp\left(\dfrac{j2\pi \times}{1 \times \dfrac{d}{\lambda}\sin(\theta)}\right) & \exp\left(\dfrac{j2\pi \times}{2 \times \dfrac{d}{\lambda}\sin(\theta)}\right) & \cdots & \exp\left(\dfrac{j2\pi \times (N_t - 1)1 \times}{\dfrac{d}{\lambda}\sin(\theta)}\right) \end{bmatrix}^T \quad \text{[Equation 12]}$$

In Equation 12, the λ indicates a wavelength and the d indicates an inter-antenna distance. For clarity, in order to represent an antenna radiation pattern of a hybrid beamformer, the RF chain number $N_{RF}$ is assumed as 4 and the per-RF chain analog antenna number $N_t^{RF}$ is assumed as 4.

Figure 7:
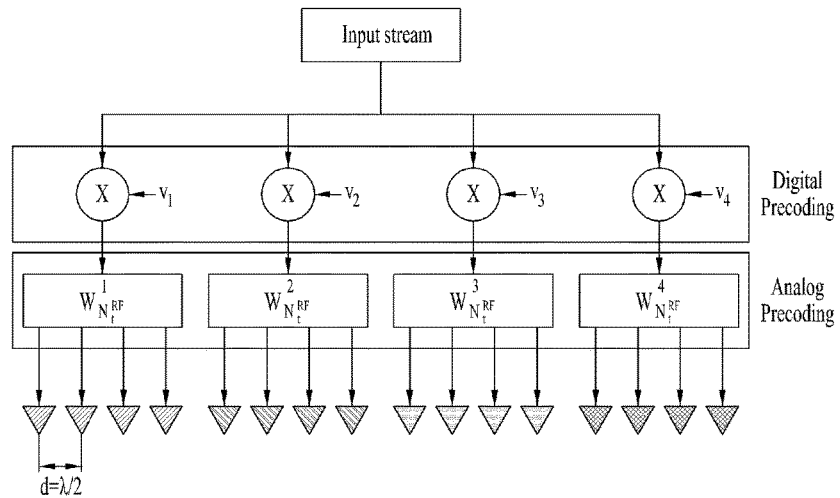
FIG. 7 is a diagram of 16-ULA antenna structure configured with 4 RF chains according to one embodiment of the present invention.

FIG. 7 is a diagram of 16-ULA antenna structure configured with 4 RF chains according to one embodiment of the present invention. Particularly, in FIG. 7, the total transmitting antenna number $N_t$ is 16 and it is d=λ/2. According to the example shown in FIG. 7, a precoding matrix for an analog beamforming is defined as Equation 13.

$$F^{RF} = \begin{bmatrix} w^1_{N_t^{RF}} & 0 & 0 & 0 \\ 0 & w^2_{N_t^{RF}} & 0 & 0 \\ 0 & 0 & w^3_{N_t^{RF}} & 0 \\ 0 & 0 & 0 & w^4_{N_t^{RF}} \end{bmatrix}, \quad \text{[Equation 13]}$$

$$w^j_{N_t^{RF}} = \begin{bmatrix} w^j_1 \\ w^j_2 \\ w^j_3 \\ w^j_4 \end{bmatrix}$$

In order to form a beam toward a boresight, i.e., a direction of a center of a main lobe of a radio wave radiating from an antenna, a steering angle of the beam is set to 0°. Hence, a value of each of elements of weight vectors of an analog precoding matrix becomes 1. In this case, a random weight vector of a rank 1, which is to be applied to a digital beamforming stage, is defined as Equation 14 in the following. For clarity, a rank 1 is assumed, by which the present invention is non-limited.

$$F^{BB} = v_1[v_1 v_2 v_3 v_4]^T \quad \text{[Equation 14]}$$

A antenna array response vector to which the digital beamforming of Equation 14 is applied at the boresight (θ=0°) can be represented as Equation 15. In this case, an inter-antenna distance d is assumed as λ/2.

$$\sum a(\theta) = \quad \text{[Equation 15]}$$

$$\sum_{i=0}^{15} a_i(\theta) = (1 + \exp(j\pi \times \sin(\theta)) + \exp(j\pi 2 \times \sin(\theta)) +$$

$$\exp(j\pi 3 \times \sin(\theta))) \times v_1 +$$

$$(\exp(j\pi 4 \times \sin(\theta)) + \exp(j\pi 5 \times \sin(\theta)) +$$

$$\exp(j\pi 6 \times \sin(\theta)) + \exp(j\pi 7 \times \sin(\theta))) \times v_2 +$$

$$(\exp(j\pi 8 \times \sin(\theta)) + \exp(j\pi 9 \times \sin(\theta)) +$$

$$\exp(j\pi 10 \times \sin(\theta)) + \exp(j\pi 11 \times \sin(\theta))) \times v_3 +$$

$$(\exp(j\pi 12 \times \sin(\theta)) + \exp(j\pi 13 \times \sin(\theta)) +$$

$$\exp(j\pi 14 \times \sin(\theta)) + \exp(j\pi 15 \times \sin(\theta))) \times v_4$$

Equation 15 can be summarized into Equation 16.

$$\sum a(\theta) = \quad \text{[Equation 16]}$$

$$(1 + \exp(j\pi \sin(\theta)) + \exp(j\pi 2\sin(\theta)) + \exp(j\pi 3\sin(\theta))) \times$$

$$(v_1 + \exp(j\pi 4\sin(\theta)) \cdot v_2 +$$

$$\exp(j\pi 8\sin(\theta)) \cdot v_3 + \exp(j\pi 12\sin(\theta)) \cdot v_4) =$$

$$\left(\sum_{i=1}^{4} s_i\right) \times \left(\sum_{i=1}^{4} t_i\right) = \sum s \times \sum t$$

The s in Equation 16 is expressed as Equation 17 and shall be named a beam bound vector. And, the t in Equation 16 is expressed as Equation 18 and shall be named a beam gain and steering vector or a beam steering vector.

$$s = \begin{bmatrix} 1 \\ e^{j\pi \sin(\theta)} \\ e^{j\pi 2\sin(\theta)} \\ e^{j\pi 3\sin(\theta)} \end{bmatrix} \quad \text{[Equation 17]}$$

$$t = \begin{bmatrix} 1 & 0 & 0 & 0 \\ 0 & e^{j\pi 4\sin(\theta)} & 0 & 0 \\ 0 & 0 & e^{j\pi 8\sin(\theta)} & 0 \\ 0 & 0 & 0 & e^{j\pi 312\sin(\theta)} \end{bmatrix} \begin{bmatrix} v_1 \\ v_2 \\ v_3 \\ v_4 \end{bmatrix} \quad \text{[Equation 18]}$$

The beam bound vector s indicates a pattern of an analog beam in a hybrid beamforming. The beam steering vector t indicates a gain of a hybrid beam and a pattern of a digital beam in a hybrid beamforming.

The beam bound vector s determines a range and boundary for forming a hybrid beam validly by a hybrid beamforming scheme. Hence, a range of a digital beamforming is limited within a beam bound vector as well as a range of an analog beamforming. For instance, since an analog beam cannot be validly formed over the range of the beam bound vector, it is unable to perform a hybrid beamforming over the range of the beam bound vector. Eventually, since the digital beamforming should be performed within the range of the beam bound vector, it is able to perform the hybrid beamforming.

Figure 8:
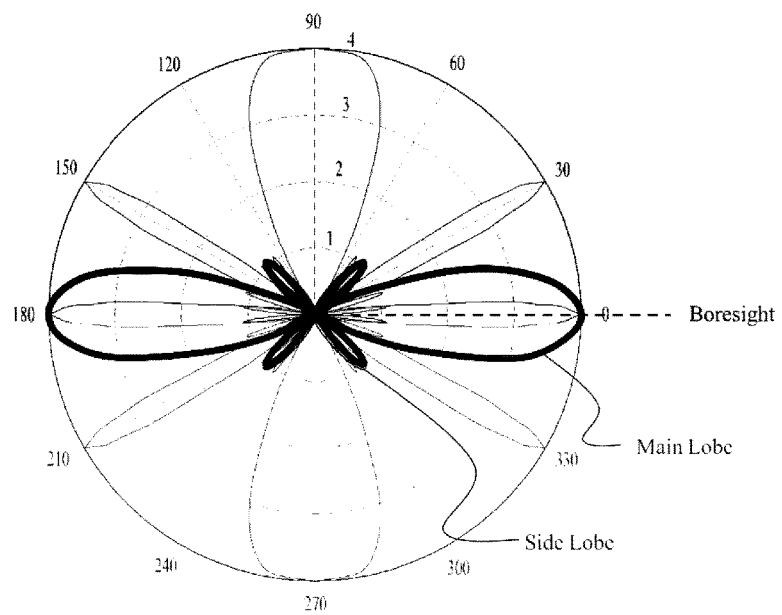
FIG. 8 is a diagram of beam patterns by a beam bound vector and a beam steering vector.

FIG. 8 shows patterns of an analog beam and a digital beam by a beam bound vector and a beam steering vector in a prescribed plane 2-dimensionally. Although an analog beam and a digital beam can be illustrated in 3D pattern, it is apparent to those skilled in the art that they are illustrated in horizontal cross-sections for clarity of the following description. In FIG. 8, $N_t=16$, $N_t^{RF}=4$, $N_{RF}=4$ are assumed. A beam pattern of a beam band vector is denoted by a thick line, while a beam pattern of a beam steering vector is denoted by a thin line. A boresight of a main lobe of the beam bound vector is 0 degree (or 180 degrees).

A pattern of each beam has a maximum gain at a beam steering angle (i.e., a boresight of a main lobe). As the pattern deviates from the beam steering angle, a beam gain is reduced. The beam gain is represented as a distance from a circle center shown in FIG. 8. A steering angle of a beam is represented as increasing counterclockwise with reference to zero degree.

A beam steering vector can form a beam at 0 degree, 30 degrees, 90 degrees, 150 degrees, 180 degrees, 210 degrees, 270 degrees, or 330 degrees. A hybrid beamforming can be performed in an area where a beam pattern of a beam bound vector and a beam pattern of a beam steering vector cross with each other. For instance, when a steering angle is 0 (or 180), since a gain by a beam bound vector and a gain by a beam steering vector become maximum values, respectively, it is appropriate for a hybrid beamforming to be performed at a point where a steering angle is 0 degree (or 180 degrees). On the other hand, when a steering angle is 30 degrees, since a gain of a beam bound vector is 0, it is unable to perform a hybrid beamforming on the steering angle '30 degrees'.

Figure 9:
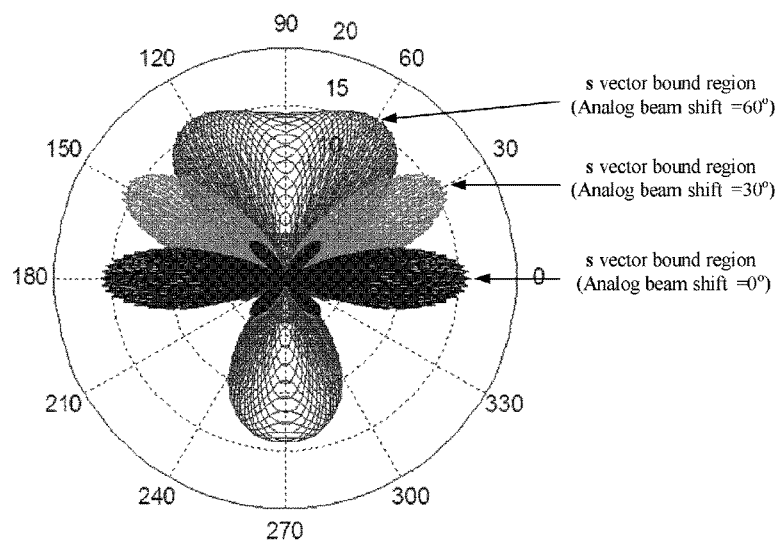
FIG. 9 is a diagram of a beam pattern of a final antenna array response vector in response to an analog beam transition according to one embodiment of the present invention.

FIG. 9 shows an antenna array response when a steering angle of an analog beam is shifted at 0 degree, 30 degrees, or 60 degrees. In FIG. 8, it is assumed that $N_t=16$, $N_t^{RF}=4$, $N_{RF}=4$. And, a result from applying digital $v_1=[v_1\ v_2\ v_3\ v_4]^T$ is shown in FIG. 9. As mentioned in the foregoing descriptions with reference to FIG. 8 and FIG. 9, a range of a valid beam is limited by the vector s.

Reference Beam Forming

Figure 10:
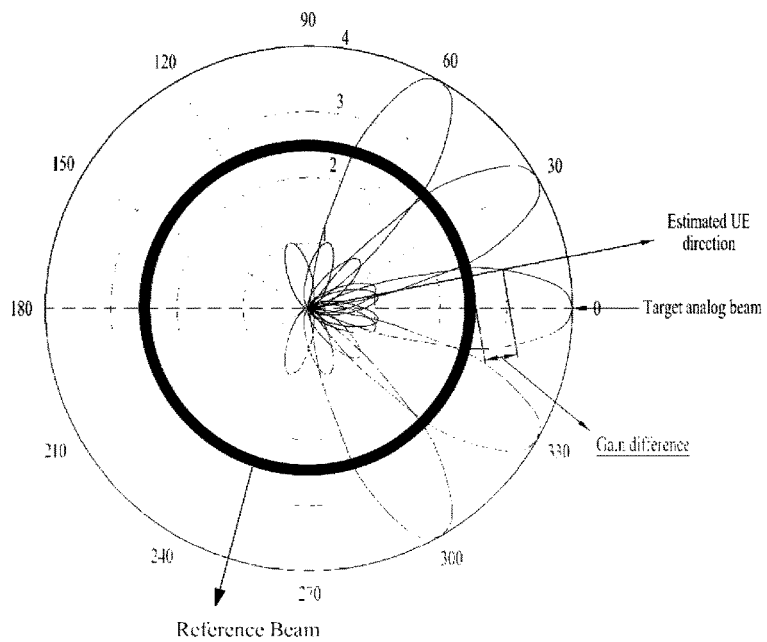
FIG. 10 is a diagram for one example of a method of calculating a gain difference between a reference beam and a bounded beam according to one embodiment of the present invention.

According to one embodiment of the present embodiment, a reference beam is proposed. A reference beam, as shown in FIG. 10, can be designed to have the same beam gain in omni-directions. For instance, a base station can form a reference beam through an omni-directional antenna. According to another embodiment, a base station is able to from an omni-directional beam having a beam gain of 0 dB using a single antennal. According to further embodiment of the present embodiment, a base station is able to generate a directional beam using multiple antennas and is also able to form an omni-directional beam approximately for a prescribed area.

A base station is able to periodically transmit a reference beam. And, a transmission periodicity of the reference beam may be set for a user equipment by RRC signaling or may be broadcasted as a portion of system information. A reference beam may be generated based on a reference signal, by which the present invention is non-limited.

In case of ignoring an environment that causes interference, noise, propagation hindrance from neighbor cells or other user equipments, a gain of a reference beam is identical for all steering angles. For all directions having the same straight-line distance between a base station and a user equipment, gains of a reference beam are equal to each other. A transmission power of a base station for forming a reference beam is uniformly fixed or may be fixed to a cell-specific value. A gain of a reference beam may vary depending on a distance from a base station. In particular, the farther a distance from a base station gets, the less a gain of a reference beam becomes. Hence, a gain of a reference beam may be used as an index for a straight-line distance between a base station and a user equipment.

Gain Difference Between Reference Beam and Bounded Beam

As mentioned in the foregoing description, although a digital beamforming is performed in all directions by fixing a direction of an analog beamforming (e.g., $F^{RF}$ fixed), a range of a formable hybrid beam is limited to a range within a beam bound vector. Hereinafter, a beam of a beam bound vector shall be named a bounded beam. Since a digital beamforming component is excluded from a bounded beam, a bounded beam in a hybrid beamforming can be formed through an equivalent analog beamforming.

According to one embodiment of the present embodiment, through a difference between a gain of a reference beam measured by a user equipment and a gain of a bounded beam measured by the user equipment, a user equipment located direction from a base station can be estimated. For instance, a base station forms bounded beams ($F^{RF}=0°$, ±30°, ±60°) through an analog beamforming. In this case, the steering angles of the bounded beams can be changed variously. In case of increasing resolution, a beamforming may be performed by a unit smaller than 30.

A base station forms bounded beams sequentially for respective steering angles or may be able to form bounded beams in multiple directions through different analog devices simultaneously. For instance, a specific timing and angle for a base station to form a bounded beam are previously defined, broadcasted through a system information, or set at a user equipment through RRC signaling.

FIG. 10 is a diagram for one example of a method of calculating a gain difference between a reference beam and a bounded beam according to one embodiment of the present invention. Referring to FIG. 10, a user equipment (UE) is located on a straight line in an estimated UE direction. A gain ($G_{ref}$) of a reference beam appears at a point where a straight line indicating a UE located direction and a circle indicating the reference beam cross with each other. Similarly, a gain ($G_{mea}$) of a bounded beam appears at a point where a straight line indicating a UE located direction and a bounded beam (0°) cross with each other. Meanwhile, since a user equipment is unable to measure bounded beams formed at different steering angles (e.g., 30°, 60°, etc.), a gain of a beam does not appear.

A difference between a gain ($G_{ref}$) of a reference beam and a gain ($G_{mea}$) of a bounded beam is defined as Equation 19.

$$G_{diff}=G_{mea}-G_{ref}(dB) \quad \text{[Equation 19]}$$

According to one embodiment of the present invention, a user equipment transmits feedback information to a base station based on a difference ($G_{diff}$) between a gain ($G_{ref}$) of a reference beam and a gain ($G_{mea}$) of a bounded beam. For instance, the user equipment is able to transmit the difference ($G_{diff}$) to the base station. According to another embodiment of the present invention, a user equipment individually measures a gain ($G_{ref}$) of a reference beam and a gain ($G_{mea}$) of a bounded beam and may be then able to feed back the measured gains simultaneously or separately.

Fast Analog Beam Scanning

In order to acquire the locations of the transmitting end and receiving end and a weight of analog beamforming optimized in a radio channel environment, a process of trial transmission and measurement (or estimation) of several candidate analog beams between the transmitting end and the receiving end is required. This process is referred to as analog beam scanning or analog beam training.

According to an embodiment of the present invention, a method of fast analog beam scanning capable of lowering beam scanning complexity and search time for analog beamforming is proposed. The analog beamforming may be performed through a pure analog beamforming transmitting end/receiving end or a hybrid beamforming transmitting end/receiving end. Generally, one analog beam may be scanned per analog beamforming operation. Therefore, the training time required for full analog beam scanning is proportional to the total number of candidate analog beams.

As described above, normal analog beamforming requires a beam scanning process in the time domain for beam estimation in the transmitting end and receiving end. That is, to perform analog beam estimation, a time of $K_T \times K_R$, a product of the number of transmission beams and the number of reception beams, is required. When the process of analog beam estimation is finished, the UE may feed back a beam identifier (ID) having the highest signal strength to the eNB.

When the time taken to scan one analog beam is $t_s$, the time $T_s$ taken to scan all transmitted/received analog beams may be expressed by Equation 20 below.

$$T_S = t_s \times (K_T \times K_R) \quad \text{[Equation 20]}$$

In Equation 20, when the number of transmitted analog beams is $K_T=L$, and the number of received analog beams is $K_T=1$, the total number of candidate analog beams is L. Therefore, L time intervals are needed in the time domain for full beam scanning.

Figure 11:
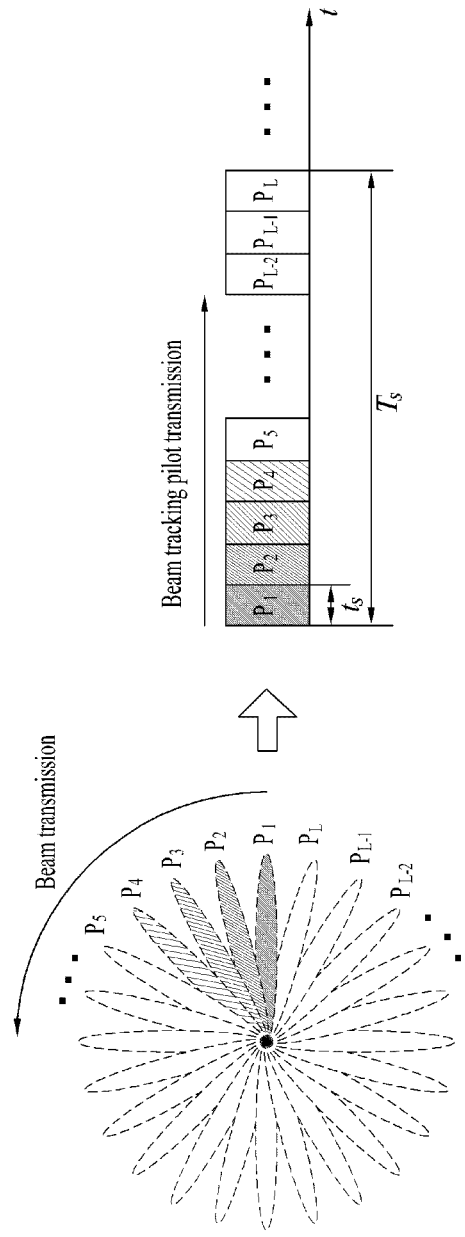
FIG. 11 is a diagram illustrating a beam estimation interval in the time domain required for analog beam tracking.

FIG. 11 is a diagram illustrating a beam estimation interval in the time domain required for analog beam tracking.

Referring to FIG. 11, regarding analog beam estimation, only one beam estimation is possible in a single time interval, and L time intervals are needed to perform L beam estimations. In other words, as the number of individual beams increases due to increase in the number of transmit/receive antennas, a longer training time is needed.

Analog beamforming entails changing the magnitude and phase angle of a digital-to-analog converted (DAC) analog continuous waveform in the time domain. Accordingly, unlike digital beamforming, a training interval for individual beams should be guaranteed in analog beamforming. As the training interval becomes longer, the throughput loss of the system increases and the throughput loss of an additional beam scanning system may be further increased due to movement of the UE and channel change.

For an analog beamforming end among the hybrid beamformers, the training interval increases in proportion to the number of search spaces of beams. It is expected that a sharper beam will be generated due to increase in the number of physical antennas of the transmitting end/receiving end. Accordingly, considering the transmission/reception beam width and change of the antenna structure from the conventional 2D channel to the 3D channel, the beam search space is further increased as shown in Table 2 below.

TABLE 2

| | Beamwidth | 1° | 2° | 5° | 10° |
|---|---|---|---|---|---|
| 2D | Search space | 360 | 180 | 72 | 36 |
| | Exhaustive candidates (Tx beam + Rx beam) | $360^2$ | $180^2$ | $72^2$ | $36^2$ |
| 3D | Search space | 129,600 | 32,400 | 5,184 | 1,296 |
| | Exhaustive candidates (Tx beam + Rx beam) | $129,600^2$ | $32,400^2$ | $5,184^2$ | $1,296^2$ |

In addition, an approximate beam training time, that is, a search time, according to increase in the search space may be estimated as follows. For simplicity, Table 3 is limited to 2D channels. Referring to Table 3, it may be seen from comparison between the beam widths of 10° and 1° that the search time is increased by 100 times when the number of search spaces is increased by 10 times.

TABLE 3

| | | Beamwidth | | | |
|---|---|---|---|---|---|
| | | 1° | 2° | 5° | 10° |
| 2D | Search space (Tx beam + Rx beam) | 720 | 360 | 144 | 72 |
| | Exhaustive search time | 5.37 s | 1.34 s | 215.0 ms | 53.8 ms |

As described above, analog beam scanning requires a training interval in a given time domain, and loss in transfer rate of the system occurs since data transmission is impossible in the beam training interval. In addition, since transmitting end-based beamforming requires the receiving end to feed back information on optimum beam selection to the transmitting end, delay in data transmission occurs for the time taken for the feedback procedure.

Basically, when the number of physical antennas M increases, the beam gain increases by $10 \log_{10} M$ in proportion to M, and resolution of the beam also increases. In other words, if the beam width is narrowed as the beam resolution increases, a lot of time is required to perform analog beam training in the beamformers of both the transmitting end and the receiving end. Accordingly, substantial overhead occurs due to the analog beam training prior to processing of the digital ends, and when delay in data transmission occurs due to feedback of the estimated beam information, the final gain of hybrid beamforming is significantly reduced.

In the following embodiments, an analog reception beam scanning method for reducing delay in beam scanning is proposed in which feeding back the beam scanning information is not included. According to an embodiment of the present invention, the transmitting end acquires weights (or coefficients) of the analog beam and the digital beam through the reception beam scanning which is based on the reciprocity of the channel, and performs analog beamforming or digital beamforming using the weights. In the proposed method, the beam training time is reduced by reducing the number of beam search spaces. Feedback of estimated beam information is omitted.

Figure 12:
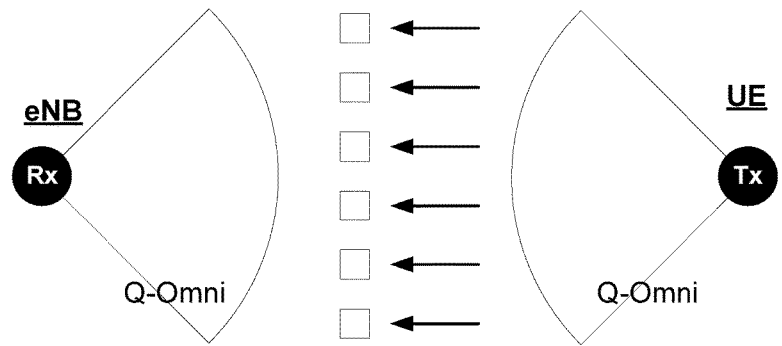
FIG. 12 illustrates a method for measuring a reference beam according to an embodiment of the present invention.

FIG. 12 illustrates a method for measuring a reference beam according to an embodiment of the present invention.

In FIG. 12, it is assumed that the receiving end is an eNB and the transmitting end is a UE, but the present invention is not limited thereto.

The UE transmits an omnidirectional beam or a quasi-omnidirectional beam through transmission beamforming only once for the first time or with a relatively long periodicity. The omnidirectional beam or quasi-omnidirectional beam transmitted by the UE corresponds to a reference beam (reference signal).

The eNB forms an omnidirectional beam or a quasi-omnidirectional beam through reception beamforming and measures the signal strength of the reference beam received from the UE.

Unlike the typical analog beam scanning method, by radiating a quasi-omnidirectional pattern, the eNB acquires the signal strength (Gref) of the reference beam. Radiation of the quasi-omnidirectional pattern only needs to be performed once for the first time during the beam scanning process. In addition, the quasi-omnidirectional pattern is transmitted when the reference signal received power (RSRP) or the SINR value of the UE changes beyond a reference value, or is intermittently transmitted with a relatively long periodicity.

Figure 13:
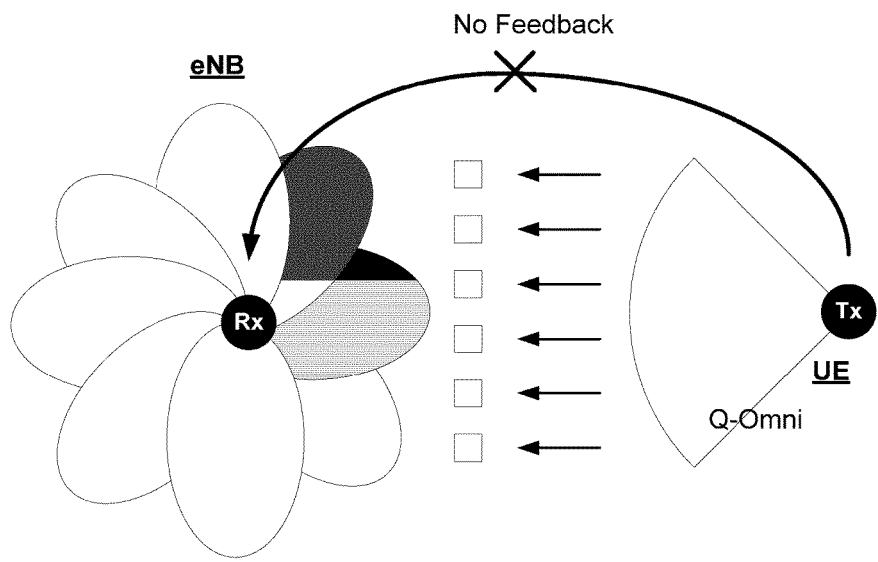
FIG. 13 illustrates a method for scanning a sector beam according to an embodiment of the present invention.

FIG. 13 illustrates a method for scanning a sector beam according to an embodiment of the present invention. In FIG. 13, it is assumed that the receiving end is an eNB and the transmitting end is a UE, but the present invention is not limited thereto. The sector beam of FIG. 13 corresponds to the target beam shown in FIG. 10. The sector beam may be referred to as a target beam, a coarse beam, or a directional beam.

The UE transmits a quasi-omnidirectional beam to the eNB. At this time, the eNB forms a sector beam through reception beamforming. All directions may be covered through a limited number of sector beams. The eNB detects a sector having the largest gain of reception beamforming among the sector beams. The eNB calculates a difference $G_{diff}$ between the signal strength $G_{mea}$ received through the sector beam having the largest gain of reception beamforming and the signal strength $G_{ref}$ of the reference beam acquired in FIG. 12. Thereby, beam scanning is terminated without additional feedback. The eNB acquires a coefficient of beamforming based on the gain difference and applies the same to the next beamforming.

Figure 14:
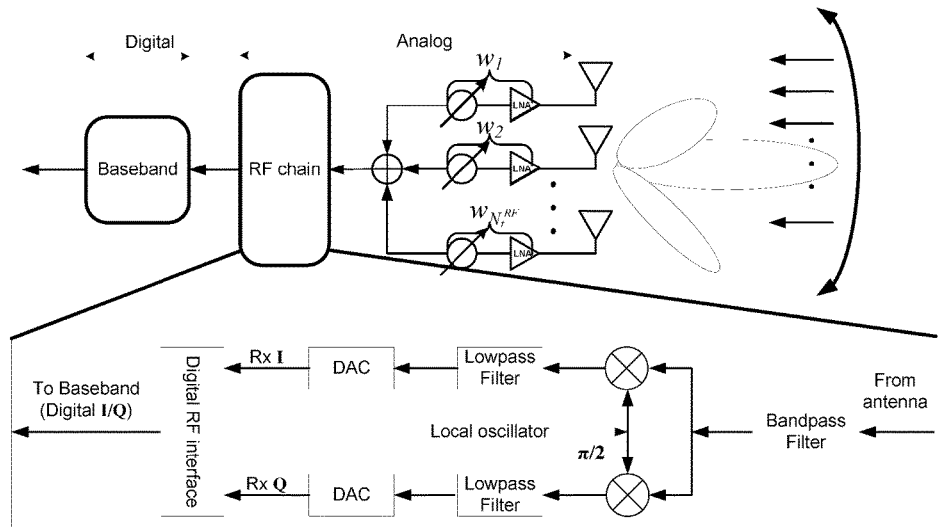
FIG. 14 illustrates a method for acquiring an analog beam coefficient according to an embodiment of the present invention.

FIG. 14 illustrates a method for acquiring an analog beam coefficient according to an embodiment of the present invention. Analog coefficients such as a phase shifter (PS) value and a power amplifier (PA) value for analog beam control may be acquired based on the calculated gain difference. The acquired analog beam coefficients are applied directly to the PS and PA.

The analog beam coefficients may be expressed as equivalent precoding weights, which are shown in Equation 21 below.

$$P_i = w^i_{N_t^{RF}} = \begin{bmatrix} w^i_1 \\ w^i_2 \\ \vdots \\ w^i_{N_t^{RF}} \end{bmatrix}$$ [Equation 21]

In Equation 21, $P_i$ denotes a PMI representing analog precoding weights. The final analog precoding weight is derived using the sector ID and the beam gain difference $G_{diff}$ by which the maximum gain of reception beamforming is obtained.

The eNB selects a PMI or analog beamforming vector corresponding to the directly detected gain difference $G_{diff}$. In addition, the eNB may estimate the exact position of the UE within the selected analog beam based on the gain difference. Therefore, the eNB selects an analog beamforming coefficient such that the direction of the final beam through hybrid beamforming coincides with the estimated position of the UE. Table 6 illustrates a codebook for acquiring the PMI of analog beamforming according to the gain difference $G_{diff}$.

TABLE 4

| Analog beam index (beam ID) | Gain difference (dB) | PMI |
|---|---|---|
| Beam ID #1 | $G_1$ | $P_1$ |
| | $G_2$ | $P_2$ |
| | . | . |
| | . | . |
| | . | . |
| | $G_L$ | $P_L$ |
| Beam ID #2 | $G_1$ | $P_{L+1}$ |
| | $G_2$ | $P_{L+2}$ |
| | . | . |
| | . | . |
| | . | . |
| | $G_L$ | $P_{2L}$ |
| . | . | . |
| . | . | . |
| . | . | . |

Figure 15:
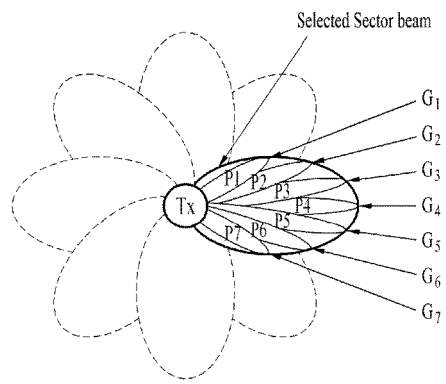
FIG. 15 illustrates a PMI of an analog beam derived based on a beam gain difference according to an embodiment of the present invention.

FIG. 15 illustrates a PMI of an analog beam derived based on a beam gain difference according to an embodiment of the present invention. The above procedure means that the PMI of the final analog beam is selected based on the gain difference acquired through the sector beam. Therefore, the eNB sets the values of PS and PA through PMI for analog beamforming.

In the case where it is difficult to determine the correct PMI using the gain difference Gdiff alone (e.g., NLOS environment, High Doppler environment, low reference beam density, etc.), the codebook shown in Table 5 in which the gain difference Gdiff is mapped to multiple PMIs may be used.

TABLE 5

| Analog beam index (beam ID) | Gain difference (dB) | PMI |
|---|---|---|
| Beam #1 (Boresight = 0°) | $G_1$ | $\{P_1, P_2\}$ |
| | $G_2$ | $\{P_2, P_3\}$ |
| | . | . |
| | . | . |
| | . | . |
| | $G_L$ | $\{P_L, P_{L+1}\}$ |
| Beam #2 (Boresight = 30°) | $G_1$ | $\{P_{L+1}, P_{L+2}\}$ |
| | $G_2$ | $\{P_{L+2}, P_{L+3}\}$ |
| | . | . |
| | . | . |
| | . | . |
| | $G_L$ | $\{P_{2L}, P_{2L+1}\}$ |
| . | . | . |
| . | . | . |
| . | . | . |

In summary, the UE repeatedly forms a quasi-omnidirectional beam of a UE through transmission beamforming, and the eNB forms a quasi-omnidirectional beam of the eNB through reception beamforming (i.e., reference beam measurement) and sequentially forms each sector beam (i.e., sector beam measurement). The eNB may perform beam scanning only for each sector beam, and the final fine beam coefficient may be estimated based on the difference described above. This is because analog beam scanning of final fine beams requires an excessively large number of symbols.

According to an embodiment of the present invention, an SRS used for UL channel state measurement or frequency selective scheduling may be used in measuring the signal strength or received signal received power (RSRP) of an analog beam in reception beamforming. For example, the UE may transmit N+1 quasi-omnidirectional beams using N+1 sounding reference signal (SRS) symbols. N denotes the number of sector beams.

Although the SRS used for channel state measurement or frequency selective scheduling is transmitted in the full band through frequency hopping, this operation is not suitable for quasi-omnidirectional beam transmission in terms of efficiency of radio resource management, and thus the SRS is not necessarily transmitted in the full band.

Figure 16:
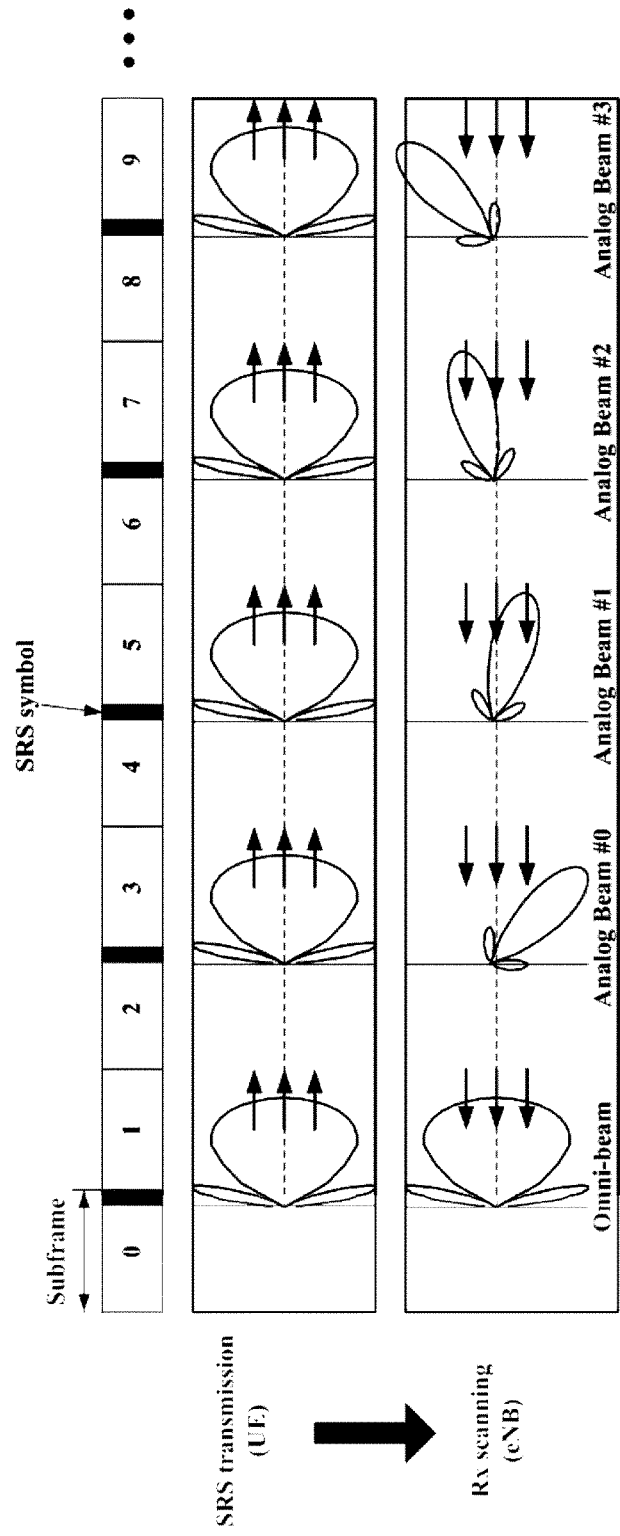
FIG. 16 illustrates beam scanning of an eNB and a UE according to an embodiment of the present invention.

FIG. 16 illustrates beam scanning of an eNB and a UE according to an embodiment of the present invention.

The UE transmits the SRS through 'N+1' periodically arranged symbols. In FIG. 16, the SRS transmission periodicity is 2 subframes. For example, the SRS is transmitted through the last OFDMA symbols of subframes #0, #2, #4, #6, and #8.

The eNB performs reception beamforming for N sector beams. The eNB does not perform beamforming for the first SRS symbol transmitted through subframe #0, or performs quasi-omnidirectional reception beamforming. Then, the eNB performs beam scanning for the remaining N SRS symbols by forming a sector beam in a predefined direction through analog beamforming. In FIG. 16, the eNB forms sector beams in the SRS symbols of each of four subframes #2, #4, #6, and #8 to scan the beams.

The eNB may configure an SRS for analog beam scanning for the UE through higher layer signaling. Table 6 illustrates parameters included in the SRS configuration.

TABLE 6

1. Number of SRS
   A parameter defining the predefined number of analog beams N + 1
2. SRS duration
   An SRS symbol period or interval for analog beam scanning
   e.g.) 2 ms, 5 ms, 10 ms, ...
3. SRS bandwidth
   The size of an SRS occupied frequency band per UE
   e.g.) 4RBs, 8RBs, 12RBs, 16RBs, 20RBs, 24RBs, 32RBs, 36RBs, 40RBs, 48RBs,
4. SRS frequency position
5. SRS transmission Comb Meanwhile, the MCS table of the LTE/LTE-A system may be used in acquiring a PMI. For example, the eNB acquires an MCS value $MCS_{ref}$ corresponding to the signal strength of the omnidirectional beam from the MCS table. Further, the eNB acquires an MCS value $MCS_{ref}$ corresponding to the signal strength of each analog sector beam from the MCS table. The eNB acquires a PMI corresponding to the difference between $MCS_{ref}$ and $MCS_{ref}$ from the codebook as shown in Table 7.

TABLE 7

| Analog beam index (beam ID) | MCS difference | PMI |
|---|---|---|
| Beam #1 (Boresight = 0°) | $M_1$ | $P_1$ |
| | $M_2$ | $P_2$ |
| | M | M |
| | $M_L$ | $P_L$ |
| Beam #2 (Boresight = 30°) | $M_1$ | $P_{L+1}$ |
| | $M_2$ | $P_{L+2}$ |
| | M | M |
| | $M_L$ | $P_{2L}$ |
| M | M | M |

In hybrid beamforming, the analog beam training time and the number of digital beam candidates cause a great deal of complexity because analog beams and digital beams may be configured in various combinations. In the present invention, the eNB may perform reception beamforming and feedback of analog beamforming may be omitted. In addition, the PMI for digital beamforming may be implicitly estimated. Since the feedback operation of the UE is omitted, the operation procedure of the transmitting end/receiving end is simplified, and complexity of beam control is lowered.

Figure 17:
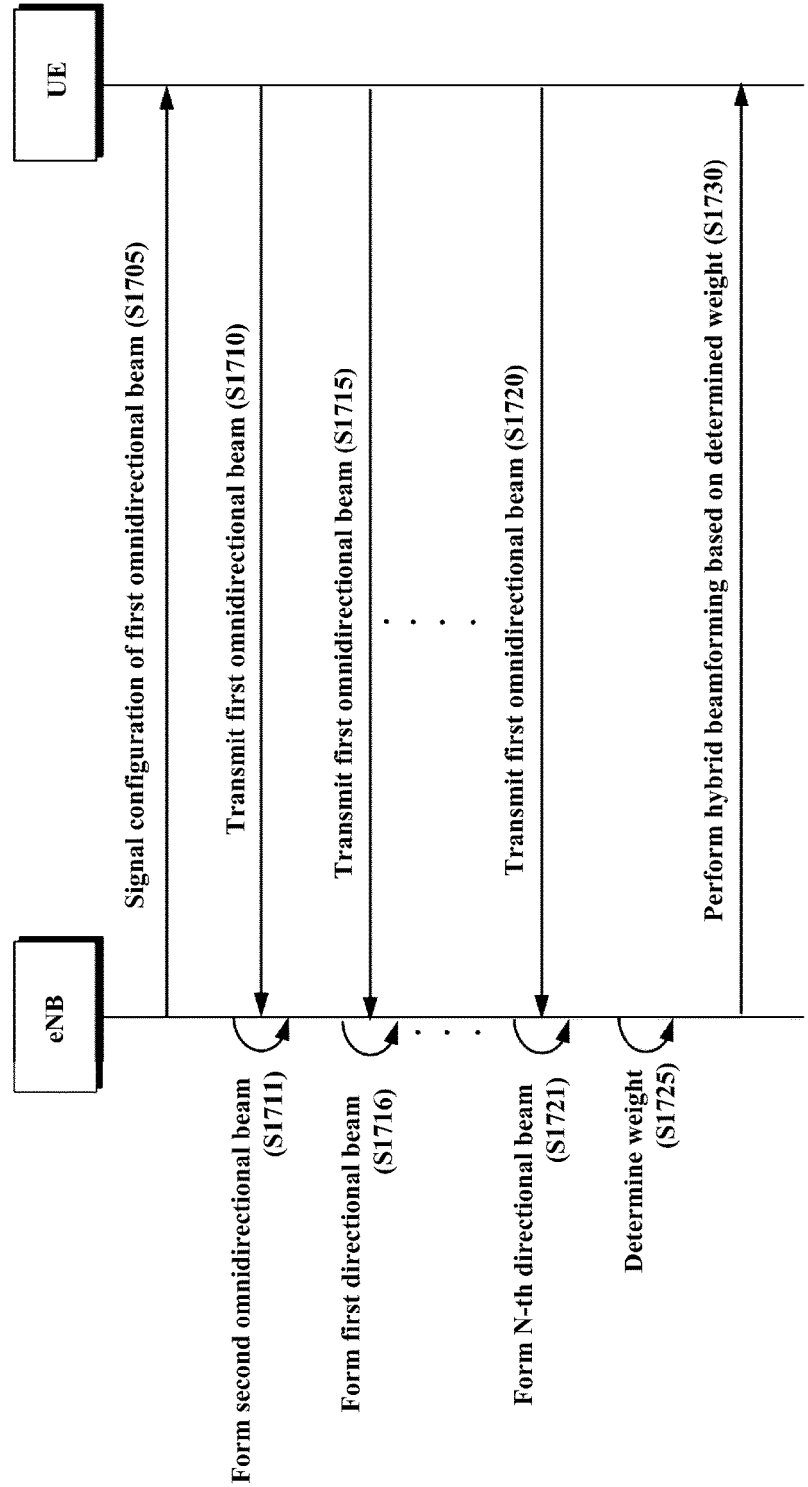
FIG. 17 illustrates flow of a weight determination method according to an embodiment of the present invention.

FIG. 17 shows flow of an analog beam scanning method according to an embodiment of the present invention. Redundant description of elements described above is omitted.

First, the eNB signals to the UE a configuration for repeated transmission of a first omnidirectional beam equally formed in all directions (S1705). The first omnidirectional beam may correspond to a quasi-omnidirectional beam transmitted through a sounding reference signal (SRS). For example, the first omnidirectional beam may serve as the reference beam described above.

The configuration for repeated transmission of the first omnidirectional beam may include at least one of the number of repeated transmissions of the first omnidirectional beam, the transmission periodicity of the first omnidirectional beam, and information about the size of the frequency band for transmission of the first omnidirectional beam. The number of repeated transmissions of the first omnidirectional beam may be determined based on the number of search spaces according to multiple directional beams formed by the eNB or the beam width of the plurality of directional beams. In this embodiment, it is assumed that the number of repeated transmissions of the first omnidirectional beam is N+1 and the number of search spaces by the plurality of directional beams is N.

The UE repeats transmission of the first omnidirectional beam N+1 times according to the configuration of the first omnidirectional beam (S1710, S1715, S1720).

The eNB forms a second omnidirectional beam and receives and measures the first omnidirectional beam that the UE initially transmitted, through the second omnidirectional beam (S1711).

The eNB receives and measures the first omnidirectional beams transmitted N times after the initial transmission by forming N directional beams through reception beamforming (S1716, S1721). The N directional beams may be sector beams (target beams or coarse beams) formed in different directions. In this embodiment, for simplicity, it is assumed that the reception gain of the first omnidirectional beam received through the first directional beam among the plurality of directional beams is the largest gain.

The eNB determines a weight for hybrid beamforming based on the difference in gain between the first omnidirectional beam received through the second omnidirectional beam and the first omnidirectional beam received through the first directional beam among the plurality of directional beams (S1725). For example, the eNB may select a PMI corresponding to the combination of the index of the first directional beam and the gain difference from the codebook. The eNB may acquire the coefficients of the PS and the PA for analog beamforming included in the hybrid beamforming, based on the selected PMI.

The eNB performs hybrid beamforming in which the analog beamforming and the digital beamforming are hierarchically coupled using the determined weight, and transmits downlink data to the UE (S1730).

Meanwhile, the above embodiments are not limited to the hybrid beam forming. For example, the present embodiments may be applied to a configuration in which the analog beamforming end is replaced by a digital beamforming end. Digital beamforming may be performed sequentially and serially for each antenna sub-group through antenna sub-grouping. The embodiments may also be applied to a digital beamforming technique having a hierarchical structure as described above.

Although the description has been made on the basis of downlink for convenience of explanation, the present invention is not limited thereto. The embodiments may be applied to various types of transmitter and receiver combinations. For example, the embodiments may be applied to a scenario of uplink transmission from the UE to the eNB, a scenario of inter-UE signal transmission (D2D, V2V, etc.), or a scenario of signal transmission between the eNBs (relay, wireless backhaul, etc.)

Figure 18:
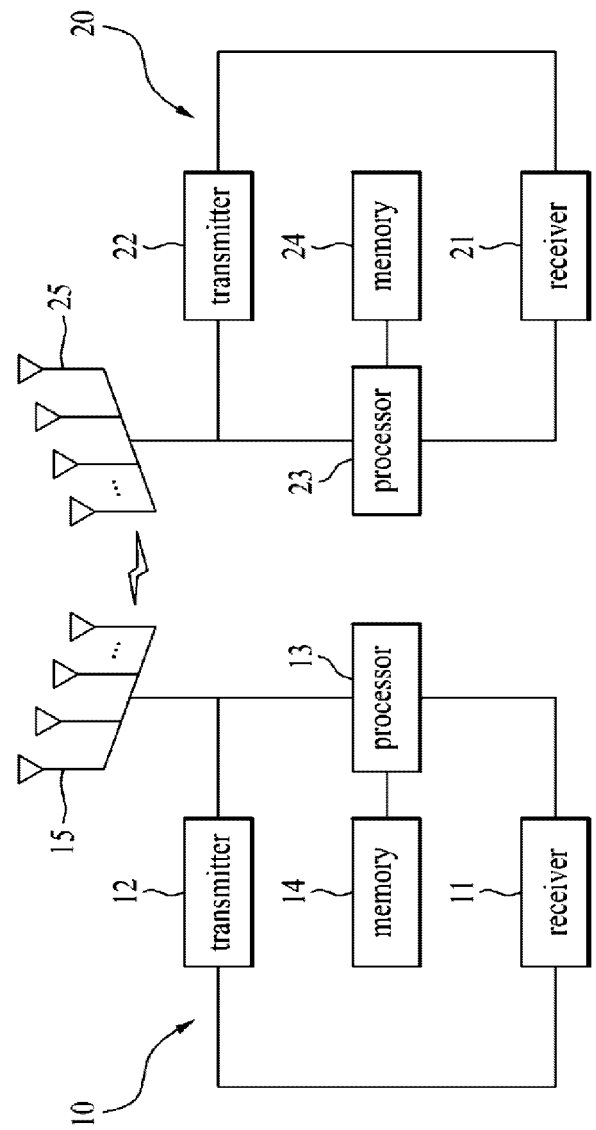
FIG. 18 is a diagram illustrating an eNB and a UE according to an embodiment of the present invention.

FIG. 18 is a diagram illustrating an eNB and a UE according to an embodiment of the present invention. The eNB 10 and the UE 20 of FIG. 18 may implement the above-described methods, and redundant description will be omitted.

The eNB 10 may include a receiver 11, a transmitter 12, a processor 13, a memory 14, and a plurality of antennas 15. The plurality of antennas 15 represents an eNB supporting MIMO transmission/reception. The receiver 11 may receive various signals, data and information from a UE on uplink. The transmitter 12 may transmit various signals, data and information on downlink to the UE. The processor 13 may control overall operation of the eNB 10.

The processor 13 of the eNB 10 also performs a function of operationally processing information received by the eNB 10 and information to be transmitted to the outside, and the memory 14 stores the operationally processed information for a predetermined time, and may be replaced by a component such as a buffer (not shown).

The transmitter of an eNB according to an embodiment signals to a UE a configuration for repeated transmission of a first omnidirectional beam equally formed in all directions. The receiver receives a first omnidirectional beam from the UE by forming a second omnidirectional beam. The receiver also repeatedly receives the first omnidirectional beam from the UE by sequentially forming a plurality of directional beams corresponding to a plurality of directions. The processor determines a weight for hybrid beamforming based on the difference in gain between the first omnidirectional beam received through the second omnidirectional beam and the first omnidirectional beam received through the first directional beam among the plurality of directional beams.

The UE 20 may include a receiver 21, a transmitter 22, a processor 23, a memory 24, and a plurality of antennas 25. The plurality of antennas 25 represents a UE supporting MIMO transmission/reception. The receiver 21 may receive various signals, data and information on downlink from the eNB. The transmitter 22 may transmit various signals, data and information on uplink to the eNB. The processor 23 may control overall operation of the UE 20.

The processor 23 of the UE 20 may also perform a function of operationally processing information received by the UE 20 and information to be transmitted to the outside, and the memory 24 may store the operationally processed information for a predetermined time, and may be replaced by a component such as a buffer (not shown).

The receiver of a UE according to an embodiment receives a configuration for repeated transmission of a first omnidirectional beam equally formed in all directions from the eNB. The transmitter repeatedly transmits the first omnidirectional beam a plurality of times according to the received configuration. The initial transmission of the first omnidirectional beam that is repeatedly transmitted is measured through a second omnidirectional beam formed by the eNB. Transmissions of the first omnidirectional beam after the initial transmission are measured through a plurality of directional beams formed by the eNB.

Embodiments of the present invention can be implemented using various means. For instance, embodiments of the present invention can be implemented using hardware, firmware, software and/or any combinations thereof.

In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein and intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

As mentioned in the foregoing description, embodiments of the present invention are applicable to various kinds of mobile communication systems.

The invention claimed is:

1. A method for determining a weight for hybrid beamforming by a base station in a wireless communication system, the method comprising:
   signaling to a user equipment a configuration for repeated transmission of a first omnidirectional beam equally formed in all directions;
   receiving the first omnidirectional beam from the user equipment by forming a second omnidirectional beam;
   repeatedly receiving the first omnidirectional beam from the user equipment by sequentially forming a plurality of directional beams corresponding to a plurality of directions; and
   determining a weight for hybrid beamforming,
   wherein the determining of the weight for hybrid beamforming comprises:
      obtaining a gain difference between the first omnidirectional beam received through the second omnidirectional beam and the first omnidirectional beam received through a first directional beam among the plurality of directional beams;
      selecting a precoding matrix indicator (PMI) from a codebook based on a combination of an index of the first directional beam and the gain difference; and
      acquiring, based on the selected PMI, a coefficient of a phase shifter and a coefficient of a power amplifier for analog beamforming of the hybrid beamforming.

2. The method according to claim 1, wherein the configuration for repeated transmission of the first omnidirectional beam comprises at least one of a number of repeated transmissions of the first omnidirectional beam, a transmission periodicity of the first omnidirectional beam, and information about a size of a frequency band for transmission of the first omnidirectional beam.

3. The method according to claim 1, wherein the first omnidirectional beam corresponds to a quasi-omnidirectional beam transmitted through a sounding reference signal (SRS).

4. The method according to claim 1, wherein a number of repeated transmissions of the first omnidirectional beam is determined based on a number of search spaces for the plurality of directional beams or a beam width of the plurality of directional beams.

5. The method according to claim 1, wherein the first directional beam is a directional beam having a largest gain for reception of the first omnidirectional beam among the plurality of directional beams.

6. The method according to claim 1, further comprising:
   performing, using the determined weight, the hybrid beamforming in which analog beamforming and digital beamforming are hierarchically coupled with each other.

7. A base station for determining a weight for hybrid beamforming in a wireless communication system, the base station comprising:
   a transmitter configured to signal to a user equipment a configuration for repeated transmission of a first omnidirectional beam equally formed in all directions;
   a receiver configured to receive the first omnidirectional beam from the user equipment by forming a second omnidirectional beam and to repeatedly receive the first omnidirectional beam from the user equipment by sequentially forming a plurality of directional beams corresponding to a plurality of directions; and
   a processor configured to determine a weight for hybrid beamforming,
   wherein the processor is configured to determine the weight for hybrid beamforming by obtaining on a gain difference between the first omnidirectional beam received through the second omnidirectional beam and the first omnidirectional beam received through a first directional beam among the plurality of directional beams, selecting a precoding matrix indicator (PMI) from a codebook based on a combination of an index of the first directional beam and the gain difference and acquiring, based on the selected PMI, a coefficient of a phase shifter and a coefficient of a power amplifier for analog beamforming of the hybrid beamforming.

* * * * *